United States Patent Office 2,721,200
Patented Oct. 18, 1955

2,721,200

SULFISOXAZOLE COMPOUNDS

Max Hoffer, Nutley, N. J., assignor to Hoffmann-La Roche Inc., Nutley, N. J., a corporation of New Jersey No Drawing. Application July 13, 1953,
Serial No. 367,771

17 Claims. (Cl. 260—239.9)

This invention relates to novel sulfisoxazole compounds and processes for their manufacture. More particularly, the invention relates to tasteless and antibacterially active compounds having a positive Bratton-Marshall reaction and a positive Hucknall-Turfitt reaction, which can be represented by the formula:

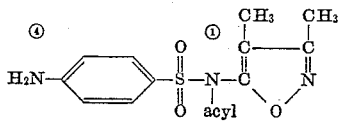

In the formula, "acyl" is any acyl radical. For example, the acyl group in the compounds of this invention includes saturated or unsaturated aliphatic carboxylic acid acyl, such as acetyl, propionyl, butyryl, oleoyl, and lauroyl, and aromatic carboxylic acid acyl, e. g., benzoyl. The acyl group may also be substituted, e. g., phenylacetyl. A preferred class includes those compounds in which the acyl group is an alkanoyl group. A still more preferred class includes those compounds in which the acyl group is a lower alkanoyl group.

The compounds of this invention are useful as therapeutic agents, more particularly they have utility as antibacterial agents, combatting both Gram positive and Gram negative organisms such as streptococci, pneumococci, staphylococci, and salmonella.

My novel compounds differ from known $N^4$-monoacyl derivatives of sulfisoxazole in that my novel compounds are fully active antibacterial agents, whereas the known compounds possess very little or no antibacterial activity. Furthermore, my novel compounds produce a positive Bratton-Marshall reaction and a positive Hucknall-Turfitt reaction, whereas the known $N^4$-compounds produce a negative Bratton-Marshall reaction and a negative Hucknall-Turfitt reaction. The Bratton-Marshall reaction and the Hucknall-Turfitt reaction are described respectively in Jour. Biological Chemistry, vol. 128, 1939, pages 537–550, and Jour. Pharmacy and Pharmacology, vol. 1, 1949, pages 368–376, at page 373.

My novel compounds have the added important characteristic of being tasteless. This is of particular advantage in preparations intended for oral administration.

My novel compounds are weak bases. They dissolve in strong aqueous acids, e. g., concentrated hydrochloric acid, 10 N sulfuric acid, forming acid addition salts which saponify to sulfisoxazole upon standing in aqueous acid solution. These new compounds, unlike the known $N^4$-acyl sulfisoxazoles, are insoluble in aqueous alkali, but saponify to sulfisoxazole upon standing in aqueous alkaline suspension.

The compounds of this invention are prepared by reacting sulfisoxazole with an acid anhydride containing the desired acyl group, or by reacting the silver salt of sulfisoxazole with an acyl halide containing the desired acyl group. Preferably, the sulfisoxazole or silver salt of sulfisoxazole is reacted with an approximately equimolecular proportion of the acylating agent in the presence of an approximately equimolecular proportion of an inert tertiary organic base catalytic agent under substantially anhydrous conditions in an inert organic solvent. Solvents such as acetone, methyl ethyl ketone, dioxane, benzene, toluene, xylene and chloroform may be used. Tertiary organic base catalytic agents, such as pyridine, picoline, lutidine, quinoline, trialkylamines (e. g., triethylamine), and alkali metal and alkaline earth metal acetates (e. g., sodium acetate), are suitable. Acetone and dry pyridine are preferred as the inert organic solvent and organic base catalytic agent respectively.

The silver salt of sulfisoxazole is produced by reacting the base with silver nitrate in dilute aqueous ammonia.

The following examples are illustrative of the present invention.

Example 1

267 g. (1 mol) of sulfisoxazole were suspended in 400 ml. of acetone and 79 g. (1 mol) of dry pyridine at 20–25° C. in a round bottom flask equipped with a stirrer and thermometer. 132 g. (1 mol) of acetic anhydride were added within 3 minutes with stirring. The sulfisoxazole dissolved in the mixture and a clear solution resulted. The temperature rose to 39–40° C. After stirring for several minutes, the product started to crystallize as a white crystalline mush. The temperature rose to 42–43° C., maintained itself at this temperature for 15–30 minutes, and then started to drop. Stirring was continued for 5 hours and the mixture was then allowed to stand for 10 hours. One liter of 2.5–3.0% ice-cold aqueous ammonia and same fresh ice were then added while stirring and the crystals were filtered without delay. The crystals were washed on the filter with 1 liter of ice-cold 1% ammonia and then with 1 liter of water. The material on the filter was well pressed off, washed with 200–300 ml. of alcohol and dried at 70° C. to constant weight. The N-monoacetyl sulfisoxazole melted at 193–194° C. and showed a positive Bratton-Marshall reaction and a positive Hucknall-Turfitt reaction.

The product is in the form of colorless crystals which are somewhat water repellent. It is insoluble in alkali but is saponified upon standing in alkaline suspension (3% ammonia). It is soluble in strong acids (20–36% HCl or 10 N $H_2SO_4$) and is rapidly saponified upon standing. Absorption spectra of N-monoacetyl sulfisoxazole in isopropanol show $\lambda_{max.}$ ca. 292–3 m$\mu$, $E_{M(max.)}$ ca. 22,900; $\lambda_{max.}$ ca. 219 m$\mu$, $E_{M(max.)}$ ca. 15,900; $\lambda_{min.}$ ca. 250 m$\mu$, $E_{M(min.)}$ ca. 3000; and the same compound in water at neutral pH $\lambda_{max.}$ ca. 218 m$\mu$, $E_{M(max.)}$ ca. 15,500; $\lambda_{max.}$ ca. 285–90 m$\mu$, $E_{M(max.)}$ ca. 20,000; $\lambda_{min.}$ ca. 245–50 m$\mu$, $E_{M(min.)}$ ca. 4200. The solubility of this compound in various common solvents is as follows: methanol, 4.93 mg./cc.; 95% alcohol, 5.7 mg./cc.; ether, 0.94 mg./cc.; chloroform, 29.0 mg./cc.; and water, 0.07 mg./cc.

Example 2

26.7 g. of sulfisoxazole were suspended in 50 ml. of acetone and 8 g. of pyridine. 16 g. of butyric anhydride were added. The material went into solution within 15 minutes and soon after that crystallization of the product began to occur. The mixture was allowed to stand for 15 hours. 500 ml. of water were then added, the crystals were filtered and washed on the filter, first with cold aqueous 3% ammonia and then with water. The N-monobutyl sulfisoxazole, recrystallized from ethyl acetate, formed white prisms melting at 174–175° C.

The product may also be recrystallized from ethyl alcohol.

Example 3

N-monopropionyl sulfisoxazole was prepared from sulfisoxazole and propionic anhydride according to the procedure described in Example 2. The product, recrystallized from alcohol, formed white prisms melting at 178° C.

*Example 4*

90 g. lauric acid and 30 g. acetic anhydride were refluxed for 6 hours. Acetic acid and the excess of acetic anhydride were distilled off in a vacuum of 12 mm. at 100° C. bath temperature. The residue, a yellowish oil, solidifying completely to lauric anhydride when cooled, was added to a suspension of 54 g. sulfisoxazole in 80 ml. acetone and 16 g. pyridine. The material gradually went into solution. After allowing the solution to stand for 12 hours at 25–30° C., 200 ml. water and 200 ml. of petroleum naphtha solvent, boiling range about 85–100° C., were added and the N-monolauroyl sulfisoxazole was permitted to crystallize in a refrigerator. The crystalline material was filtered, washed on the filter with additional petroleum naphtha solvent and finally recrystallized from 200 ml. alcohol.

The N-monolauroyl sulfisoxazole forms white prisms with a M. P. of 122° C. It is soluble in alcohol, acetone, benzene and ethylacetate.

*Example 5*

120 g. oleic acid and 50 g. acetic anhydride were refluxed for 6 hours. Acetic acid and the excess of acetic anhydride were distilled off in a vacuum at 100° C. bath temperature as completely as possible. The residue, oleic acid anhydride, was added to 54 g. of sulfisoxazole suspended in 80 ml. acetone and 16 g. pyridine. The material gradually went in solution. After allowing the solution to stand at 25–30° C. for 12 hours, 200 ml. water and 1 liter of petroleum naphtha solvent, boiling range about 85–100° C., were added. The layers were separated and the solvent layer allowed to stand in a refrigerator for crystallization. The deposited solid N-monooleoyl-sulfisoxazole was filtered on a large suction filter, and finally recrystallized from methanol.

The N-monooleoyl sulfisoxazole forms white crystals, M. P. 79–80° C., very soluble in most organic solvents, except petroleum ether and methanol. It is insoluble in water.

*Example 6*

25 g. phenylacetic acid anhydride were added to 27 g. sulfisoxazole suspended in 40 ml. acetone and 8 g. pyridine. The material first went in solution and after some time the reaction product crystallized. After 12 hours, water was added, the crystals were filtered and washed on the filter with ice-cold 2–3% aqueous ammonia, then washed with water. The N-monophenyl acetyl sulfisoxazole was recrystallized from alcohol. It forms white crystals melting at 180° C. It may also be crystallized from benzene.

*Example 7*

37.4 g. of the dry silver salt of sulfisoxazole (prepared by precipitating a solution of sulfisoxazole in 1% ammonia with the calculated amount of a 10% silver nitrate solution, filtering, washing and drying the precipitate at 100–110° C.) were suspended in a mixture of 100 ml. acetone and 10 ml. pyridine under vigorous stirring. 14 g. benzoyl chloride were dropped slowly into the stirred mixture and stirring was continued for 1 hour. A saturated solution of 25 g. sodium thiosulfate in water was added to dissolve the silver chloride which formed and to precipitate N-monobenzoyl sulfisoxazole which soon crystallized. The product was filtered, washed first with sodium thiosulfate solution, then with ice-cold 1% aqueous ammonia, and then with water. The N-monobenzoyl sulfisoxazole was recrystallized from acetic acid, forming white crystals, which melted at 207° C.

The product may also be crystallized from benzene or butanol.

I claim:
1. Compounds represented by the formula

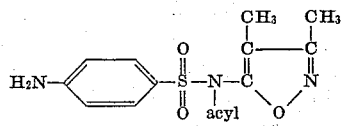

wherein acyl represents a member of the group consisting of fatty acid acyl radicals having up to 18 carbon atoms, inclusive, and aromatic carboxylic acid acyl radicals having up to 8 carbon atoms, inclusive.

2. Compounds according to claim 1 wherein the acyl radical is an alkanoyl radical having up to 18 carbon atoms, inclusive.

3. Compounds according to claim 1 wherein the acyl radical is lower alkanoyl.

4. Compounds according to claim 1 wherein the acyl radical is a member selected from the group consisting of acetyl, propionyl, and butyryl.

5. A compound represented by the formula

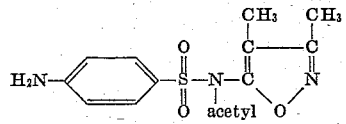

6. A compound represented by the formula

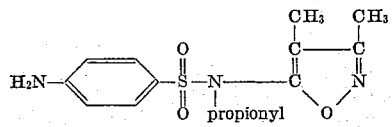

7. A compound represented by the formula

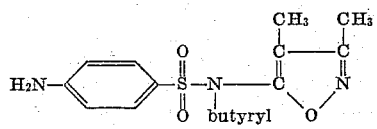

8. A process which comprises reacting an acid anhydride with sulfisoxazole in an inert organic solvent in the presence of an inert tertiary organic base catalytic agent, to produce a compound represented by the formula

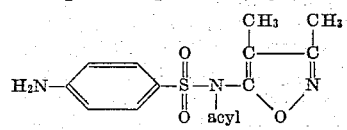

9. A process which comprises reacting an acid anhydride with an approximately equimolecular proportion of sulfisoxazole in the presence of an approximately equimolecular proportion of an inert tertiary organic base catalytic agent under substantially anhydrous conditions in an inert organic solvent to produce a compound represented by the formula

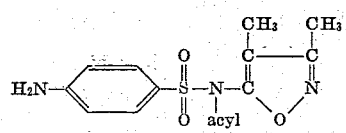

10. A process according to claim 9 in which the inert organic solvent is acetone and the tertiary organic base catalytic agent is pyridine.

11. A process which comprises reacting acetic anhydride with an approximately equimolecular proportion of sulfisoxazole in the presence of an approximately equimolecular proportion of pyridine under substantially anhydrous conditions in a solvent comprising essentially acetone to produce a compound represented by the formula

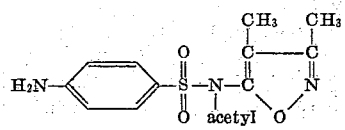

12. A process which comprises reacting propionic anhydride with an approximately equimolecular proportion of sulfisoxazole in the presence of an approximately equimolecular proportion of pyridine under substantially anhydrous conditions in a solvent comprising essentially acetone to produce a compound represented by the formula

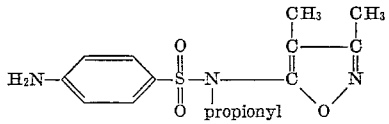

13. A process which comprises reacting butyric anhydride with an approximately equimolecular proportion of sulfisoxazole in the presence of an approximately equimolecular proportion of pyridine under substantially anhydrous conditions in a solvent comprising essentially acetone to produce a compound represented by the formula

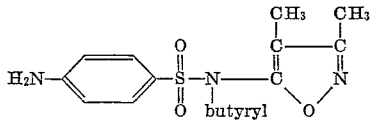

14. A process which comprises reacting an acyl halide with the silver salt of sulfisoxazole in the presence of an inert tertiary organic base catalytic agent, and under substantially anhydrous conditions in an inert organic solvent to produce a compound represented by the formula

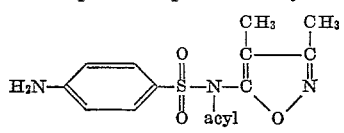

15. A process which comprises reacting an acid anhydride with sulfisoxazole in the presence of an inert tertiary organic base, to produce a compound represented by the formula

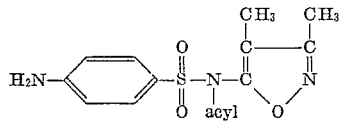

16. A process which comprises reacting acetic anhydride with sulfisoxazole in the presence of an inert tertiary organic base to produce a compound represented by the formula

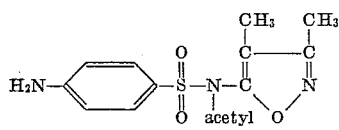

17. A process according to claim 16 wherein the inert tertiary organic base is pyridine.

References Cited in the file of this patent
UNITED STATES PATENTS
2,430,094    Wuest et al. _____ Nov. 4, 1947
OTHER REFERENCES
Northey, "The Sulfonamides and Allied Compounds" (Reinhold), pp. 37, 38, 99–101 (1948).